3,558,582
CHLORINATED POLYVINYLIDENE FLUORIDE
Robert Bacskai, Berkeley, Calif., assignor to Chevron Research Company, San Francisco, Calif., a corporation of Delaware
No Drawing. Filed Nov. 13, 1967, Ser. No. 682,594
Int. Cl. C08f *3/22, 3/24, 3/26*
U.S. Cl. 260—92.1                                              4 Claims

ABSTRACT OF THE DISCLOSURE

Chlorinated normally solid polyvinylidene fluoride containing about 2 to 35% by weight chlorine. These chlorinated polymers are clearer than unchlorinated polyvinylidene fluoride. They also adhere better to metals than the unchlorinated material. They are useful for making shaped objects and laminates.

FIELD OF INVENTION

This invention concerns novel chlorinated homopolymers of vinylidene fluoride.

INVENTION BACKGROUND

Polyvinylidene fluoride, its preparation and utility are disclosed in U.S. Pat. 2,435,537. This polymer is described as a normally solid, crystalline material softening at about 145 to 160° C. It is further described as being essentially insoluble in common solvents.

It was reported [Chemical Abstracts 42, 6159 (b)] that the chlorine analog of this polymer, polyvinylidene chloride, could not be further chlorinated.

INVENTION DESCRIPTION

It has now been found that normally solid, crystalline polyvinylidene fluoride can be chlorinated to give a material having unexpected beneficial properties. The chlorinated normally solid homopolymers of vinylidene fluoride of this invention usually contain about 2 to 35% chlorine, preferably about 5 to 15% chlorine by weight. These chlorinated polyvinylidene fluorides are colorless solids. X-ray diffraction analyses indicate that the crystallinity of the polymer decreases as chlorine is incorporated. Chlorinated polyvinylidene fluorides containing about 15% or more chlorine appear essentially non-crystalline by such analysis.

It was also found that chlorinated polyvinylidene fluorides containing more than about 5% chlorine by weight have excellent adhesion to metals such as aluminum. In comparison, the unchlorinated homopolymer does not adhere strongly to aluminum.

The chlorination also unexpectedly affects other important properties of the homopolymer. The Vicat softening point of the homopolymer is lowered by chlorination. This makes the chlorinated polymer much easier to process than its untreated precursor. The exact extent to which the softening point is lowered is proportional to the amount of chlorine incorporated in the homopolymer. Chlorination also increases the solubility of the homopolymer in conventional solvents. Another important effect is that shaped objects made from chlorinated polyvinylidene fluoride are significantly clearer than those made from the unchlorinated homopolymer. This enhanced clarity makes the chlorinated material much more attractive for uses, such as packaging, where clarity is a critical aesthetic value.

The chlorinated polymers of this invention may be prepared by dispersing or dissolving the homopolymer in a liquid medium which is inert to chlorine and passing gaseous chlorine through the dispersion or solution. When a dispersion is used, it is preferable to have the polymer in finely divided form, e.g., powder. This chlorination will normally be carried out at about 1 to 35 atmospheres and at temperatures in the range of ambient to the boiling point of the inert medium. In most circumstances temperatures in the range of about 20 and 100° C. will be used. Photochemical, free radical catalysts or other conventional chlorination catalysts may be used in the reaction if desired. The chlorination time will depend on the amount of chlorine desired to be incorporated and the reaction conditions. With conventional reaction conditions, it will usually be in the range of about 30 minutes to 48 hours.

Typical inert media which may be used in the chlorination are perchlorohydrocarbons, such as carbon tetrachloride, tetrachloroethylene and perchlorobutadiene; perfluoro compounds such as perfluoro octane; and mixed halogen compounds such as freons. Water and aqueous hydrogen chloride are also satisfactory dispersing media.

Procedures for making polyvinylidene fluoride are well known. In general they involve polymerizing vinylidene fluoride using a free radical catalyst. Physical free radical catalysts such as heat, ultraviolet light, X-rays, gamma rays, and high energy electron radiation; or chemical free-radical catalysts such as peroxides, nitriles, azo compounds and the like may be used in the reaction. Pressures between atmospheric and about 1000 atmospheres may be used. However, high pressures in the range of 500 and 1000 atmospheres are usually employed. The temperature of the polymerization will be such that sufficient free radicals are formed. Usually the temperature will be between about room temperature and 100° C.

EXAMPLES

The following examples illustrate the novel chlorinated polyvinylidene fluorides of this invention and their enhanced physical properties. These examples are offered to illustrate this invention and are not meant to limit it in any manner. Unless otherwise indicated percentages are by weight.

Example 1

A 50 gram portion of a commercial, substantially crystalline, normally solid vinylidene fluoride homopolymer was dispersed in 150 ml. $CCl_4$ in a vessel. This dispersion was heated to reflux and chlorine gas at 170 ml./min. was bubbled through it for 2 hrs. At the end of this time the reaction product was poured into 500 ml. of methanol. The resulting slurry was filtered and the residue was dried. It analyzed for 5.27% chlorine. This polymer was tested for clarity by ASTM D 1003–61. Its clarity, expressed as percent haze was 47.7. The percent haze of the unchlorinated polyvinylidene fluoride starting material was 75.0.

Other chlorinated polyvinylidene fluorides were made using the general procedure described in Example 1 but with varying chlorination times. The particulars of these chlorinated polyvinylidene fluorides are reported in Table I.

TABLE I

| | Chlorination time (hrs.) | Chlorinated product | | |
|---|---|---|---|---|
| | | Percent Cl | Vicat softening [1] point, °F. | Percent haze |
| Example No.: | | | | |
| 2 | 0.5 | 1.0 | | 62.2 |
| 3 [2] | ³4 | 2.5 | 285 | 63.7 |
| 4 | 6 | 8.3 | | 35.7 |
| 5 [2] | 6 | 12.2 | 180 | |
| 6 | 24 | 16.3 | | 34.4 |
| 7 | 48 | 26.1 | | |

[1] Determined by ASTM–D–1525–65T.
[2] 10 g. $PVF_2$ used; starting polyvinylidene fluoride had 77.6% haze and a Vicat softening point of 307° F.
[3] Chlorinated at 25–40° C.

Example 8

A 0.05 in. thick aluminum plate was placed in a 4.5 in. x 2 in. die. The plate had been previously wiped with acetone, boiled in trichloroethylene for 10 min., placed in chromate etching solution for 10 min., rinsed with tap water and air dried. The die was covered with mold release and heated to 370° F. Then 3 g. of the chlorinated polyvinylidene fluoride crumbs of Example 1 were sprinkled uniformly over the aluminum sheet. The die was closed and the polymer covered sheet was molded at 370° F. at 10 tons for 1 minute. The laminate was removed and placed in a room temperature die at 10 tons for 10 minutes. The chlorinated polyvinylidene fluoride had formed a uniform film over the aluminum surface. The film adhered strongly to the aluminum and could not be separated by hand.

Untreated polyvinylidene fluoride was similarly molded with an aluminum sheet. The resulting film of polymer showed no adherence to the sheet and separated when removed from the die.

Molded specimens of the chlorinated polyvinylidene fluorides of Examples 4 and 6 reported in Table I were made by the procedures of Example 8. The polymer film in both instances adhered strongly to the aluminum sheet and could not be separated by hand.

As indicated above, the chlorinated polymers of this invention may be useful for making molded or extruded objects such as sheets, films, containers, surface coatings and the like. Additionally, those containing above about 5% chlorine may be laminated with metals such as aluminum, magnesium, etc. These pellicular laminates will comprise at least one sheet of metal and at least one sheet of polymer bonded together. When used in the above manner, it is expected that these chlorinated polymers may be blended with other polymers, pigments, dyes, dye acceptors, heat stabilizers, fillers, plasticizers, solvents and the like.

As will be evident to those skilled in the art, various modifications on this process can be made or followed, in the light of the foregoing disclosure and discussion, without departing from the spirit or scope of the disclosure or from the scope of the following claims.

I claim:

1. Method for improving the clarity of polyvinylidene fluoride homopolymer which comprises reacting said polyvinylidene fluoride homopolymer in an inert liquid medium with gaseous chlorine at a pressure of from about 1 to 35 atmospheres and a temperature in the range of from about 20 to 100° C. thereby incorporating about 2 to 20% by weight chlorine into the polyvinylidene fluoride homopolymer.

2. The chlorinated normally solid vinylidene fluoride homopolymer of claim 1 containing from about 5 to about 15% by weight chemically combined chlorine.

3. Shaped article of the homopolymer of claim 1.

4. Film of the homopolymer of claim 1.

References Cited

UNITED STATES PATENTS

| | | | |
|---|---|---|---|
| 2,788,306 | 4/1957 | Cox et al. | 260—92.1 |
| 3,018,276 | 1/1962 | Bandes | 260—92.1 |
| 3,031,437 | 4/1962 | Iserson | 260—92.1 |
| 3,045,000 | 7/1962 | Divis | 260—92.1 |

HARRY WONG, JR., Primary Examiner

U.S. Cl. X.R.

161—189, 218; 204—159.2; 260—29.1, 29.6, 33.8, 900